United States Patent [19]

Gago et al.

[11] Patent Number: 4,735,017
[45] Date of Patent: Apr. 5, 1988

[54] COATED SEEDS AND PROCESS FOR PREPARING THEM

[75] Inventors: Ignace Gago, Braine-l'Alleud; René Detroz, Ohain, both of Belgium

[73] Assignee: Solvay & Cie (Societe Anonyme), Brussels, Belgium

[21] Appl. No.: 679,355

[22] Filed: Dec. 7, 1984

[30] Foreign Application Priority Data

Dec. 12, 1983 [FR] France ............................ 83 19983

[51] Int. Cl.$^4$ ............................................. A01C 1/06
[52] U.S. Cl. ........................... 47/57.6; 47/DIG. 9; 427/4
[58] Field of Search ............... 47/57.6, DIG. 9, 56; 71/77; 424/78; 427/4

[56] References Cited

U.S. PATENT DOCUMENTS

| | | | |
|---|---|---|---|
| 2,281,927 | 5/1942 | Fischer | 47/56 |
| 3,113,399 | 12/1963 | Eversole et al. | 47/57.6 |
| 3,648,409 | 3/1972 | Johnson et al. | 47/57.6 |
| 3,698,133 | 10/1972 | Schreiber | 47/57.6 |
| 3,704,544 | 12/1972 | Spanel et al. | 47/56 |
| 3,734,987 | 5/1973 | Hamrin | 47/57.6 |
| 3,803,761 | 4/1974 | Watts et al. | 47/57.6 |
| 3,812,618 | 5/1974 | Wood et al. | 47/57.6 |
| 3,852,913 | 12/1974 | Clendinning et al. | 47/37 |
| 3,893,258 | 7/1975 | Compton | 47/57.6 |
| 3,905,152 | 9/1975 | Loperfido | 47/57.6 |
| 3,908,308 | 9/1975 | Meyers | 47/56 |
| 3,991,517 | 11/1976 | Lewis | 47/57.6 |
| 4,149,869 | 4/1979 | Lloyd | 47/57.6 |
| 4,251,952 | 2/1981 | Porter et al. | 47/57.6 |
| 4,339,456 | 7/1982 | Rushing | 47/DIG. 9 |
| 4,383,391 | 5/1983 | Thomas et al. | 47/57.6 |
| 4,448,796 | 5/1984 | Wriser et al. | 427/4 |
| 4,493,162 | 1/1985 | Langan et al. | 47/57.6 |
| 4,495,724 | 1/1985 | Kirkland et al. | 47/57.6 |

FOREIGN PATENT DOCUMENTS 1395106 4/1964 France .
2453587 11/1980 France .
1341523 12/1973 United Kingdom .

OTHER PUBLICATIONS

Porter, T. E., "Seed Coats with Polymers" *Chem. Tech.*, vol. 8, May 1978, pp. 284–287.
Rose, A. et al. *The Condensed Chemical Dictionary*, Reinhold Publishing Corp. 1956, p. 218.

*Primary Examiner*—James R. Feyrer
*Attorney, Agent, or Firm*—Spencer & Frank

[57] ABSTRACT

The seeds are coated by means of a polyester the melting temperature of which is low.

The process consists in treating the seeds by means of a solution of the polyester in an organic solvent or by means of the polyester in the liquid or molten state.

8 Claims, No Drawings

COATED SEEDS AND PROCESS FOR PREPARING THEM

BACKGROUND OF THE INVENTION

1. Field of the Invention

The present invention relates to coated seeds and a process for preparing coated seeds.

2. Background of the Art

Seed coating is a practice which has become widespread. It is aimed in particular at improving the germination characteristics, at providing various additives capable of intervening at any time during the formation and growth of plants, at protecting the seeds or at imparting to the seed a shape or a size which is suitable for automatic sowing. It has thus been proposed to coat seeds by means of nutrients, fillers, fungicides, herbicides, insecticides, and the like.

However, the known coating processes have numerous disadvantages.

Frequently the coating does not adhere properly to the seed with the result that it does not withstand the various handling operations to which the seeds are subjected. This phenomenon is particularly sensitive in the case of the seeds with rapid water uptake. In fact, during the coating operation, considerable swelling is frequently observed in some seeds owing to water absorption. After drying, the seed retracts to regain its original size while the coating does not generally contract to the same extent; as a result, it no longer adheres properly to the seed and it becomes brittle, crumbles or disintegrates.

On the other hand, some coatings are so hard and tough that they do not dissolve or disintegrate readily under the effect of moisture and water once the seed has been sown, which is equally detrimental.

During the coating, use is made of small quantities of water, particularly for moistening the seeds before the coating operation as such, to solubilise or disperse at least one of the constituents of the coating or to solubilise or disperse the adhesive agents employed to ensure the adhesion of the other constituents of the coating. The presence of water presents disadvantages which are particularly marked when the seeds are poorly protected and absorb water rapidly. In fact, some seeds can absorb water during the coating operation, which may result in a premature initiation of germination, with the result that the seeds can no longer be stored. Furthermore, it is frequently impossible to dry the seed correctly under the coating layer, which entails risks of spoilage during the storage. These effects are particularly sensitive when the seeds employed are seeds of leguminous plants, maize and crucifers.

Moreover, some constituents of the coating, which on the whole have properties of interest, can have secondary effects of phytotoxicity for some seeds.

Finally, in some cases, it is difficult to coat the seeds in a uniform manner because their surfaces are not regular and do not permit a uniform attachment of the coatings. The adhesive agents which are usually employed to cause the other constituents of the coating to adhere to the seed do not allow all these disadvantages to be overcome simultaneously.

SUMMARY OF THE INVENTION

The present invention is aimed at providing coated seeds and a process for their preparation, which do not have the corresponding disadvantages of the seeds and the known processes.

In the coated seeds according to the invention, the coating is highly resistant in particular to embrittlement and to dry crumbling and it adheres well to the seeds with the result that the storage behaviour of the coated seeds is excellent. The coating crumbles, disintegrates or dissolves under the effect of moisture or water when the seeds are sown in their cultivation medium. In addition, it does not produce a phytotoxic effect and it makes it possible to avoid premature germination of the seeds.

The coated seeds according to the invention have an outstanding rate of germination. When the coating contains active additives, the latter are released slowly, which makes it possible to maintain their activity for a fairly long period. In addition, the invention provides seeds which can contain plant protection products, which makes it possible to avoid, at the time of the sowing, handling products which frequently exhibit some toxicity to the users.

The process according to the invention has the advantage of not requiring the use of water during the seed coating operation and thus of avoiding all the disadvantages connected with its use.

The present invention relates for this purpose to seeds coated with an anhydrous coating which has been applied to the seeds in a non-aqueous solution or an anhydrous melt, and according to which the coating contains a polyester having a low melting temperature.

Polyesters having a low melting temperature are understood to refer to those the melting temperature of which does not exceed 80° C. and preferably does not exceed 60° C. In general, the polyesters are chosen from those the melting temperature of which is below 60° C.

Various types of polyesters are suitable. The polyesters may be homopolymers or copolymers. In general, the polyesters are chosen from the homo- and copolymers of lactones such as $\epsilon$-caprolactone and $\delta$-valerolactone. Most frequently they are chosen from the homo- and copolymers of $\epsilon$-caprolactone.

The lactone copolymers may contain various types of comonomer units. In general, the materials involved are copolymers of a lactone with an olefin oxide such as ethylene oxide or propylene oxide, with a lactam such as caprolactam, with another lactone, or with a mixture of a glycol such as ethylene glycol and a dicarboxylic acid, preferably non-cyclic such as adipic acid. The lactone copolymers may contain variable quantities of monomer units derived from the lactone. In general, they contain at least 10% and most frequently at least 20% of their weight of monomer units derived from the lactone. In most cases this proportion does not exceed 95% and preferably does not exceed 90% of the weight of the polymer.

Polyesters of the homopolymer type are highly suitable. Among these, lactone homopolymers are particularly highly suitable. Homopolymers of $\epsilon$-caprolactone have given excellent results.

The polyesters according to the invention may have variable mean molar masses. In general, their mean molar mass is at least 300 and most frequently at least 500. In general their mean molar mass does not exceed 60,000 and most frequently does not exceed 50,000. Excellent results have been obtained with polyesters of a mean molar mass of approximately 800 to 10,000.

The coating may also contain various additives. Thus it may contain fillers of an organic or inorganic type.

Mixtures of fillers may also be incorporated in it. The fillers are fine powders which generally have a particle size distribution such that they pass through a 170 mesh sieve and preferably through a 325 mesh sieve (U.S. Standard). In general, use is made, as fillers of an organic type, of natural products based on cellulose such as powder derived from wood or earth flour. Use is made, as fillers of inorganic or mineral type of products based on silica, silicates, carbonates, or calcium salts. In general, use is made of fillers chosen from ground or precipitated silica, ground sand, bentonite, talc, kaolin, diatomaceous earths, fuller's earths, vermiculite, clay, limestone, chalk, calcium carbonate, calcium oxide, calcium hydroxide, plaster, and their mixtures. In general, non-pytotoxic fillers are employed.

The coating may also contain one or more other additives such as plant protection products, more particularly insecticides, nematocides, fungicides, disinfectants, repellents, herbicides and growth regulators, agents making it possible to protect the seeds against the harmful actions of the selective herbicides, such as activated charcoal, nutrients (fertilisers), agents capable of improving germination and product quality, bacteria capable of beneficially affecting the germination, the formation or growth of plants, and the like.

Good results are obtained when the coating contains plant protection products and more particularly fungicides. Examples of suitable fungicides are given in the List of Phytopharmaceutical Products published by the Ministry of Agriculture, Plant Protection Department, Brussels, 1968 and 1981, and in the Phytosanitary Index published by the ACTA, Paris, 1981, pages 195 to 268. Methoxyethylmercury acetate, benomyl, captan, copper hydroxyquinolate, thiram, thiabendazole, ethirimol, maneb and captafol are highly suitable. Good results have been obtained with benomyl, captan and methoxyethylmercury acetate.

Good results are obtained when the coating contains bacteria capable of beneficially affecting the germination, formation or growth of plants, such as Rhizobium.

DESCRIPTION OF THE PREFERRED EMBODIMENTS

The total dose of coating can vary within very wide limits depending on the type of seeds, their shape and their size. The total dose of coating is generally at least 0.0001 times the weight of the seeds. Most frequently, this dose does not exceed 100 times the weight of the seeds, without this limit being critical. When it is unnecessary to give the coated seeds a predetermined shape or size, the coating dose is most frequently at least 0.01 and preferably at least 0.1% of the weight of the seeds and generally it does not exceed 200% and preferably does not exceed 100% of their weight. Where it is intended to give the seeds a predetermined shape and size, the coating dose is generally at least 0.5 and most frequently at least 1 times the weight of the seeds and in general it does not exceed 100 and most frequently 50 times their weight.

The doses of polyesters in the coating according to the invention can be very variable. They can be from 0.01 to 100% of the total weight of the coating. In general the concentration of polyesters represents from 1 to 100% of the weight of the coating, excluding the fillers. The coating may consist essentially of the polyesters according to the invention. In this case the coating contains generally more than 50% by weight, particularly from 80% to 100% by weight, of polyesters according to the invention. When the coating needs to impart a predetermined shape or size to the seeds, the coating contains generally from 0.01 to 30% and most frequently from 0.1 to 20% by weight of polyesters according to the invention.

The concentration of fillers can vary within very wide limits. It is in general between 0 and 99% of the total weight of the coating and preferably between 0.1 and 99% of the total weight of the coating. Concentrations of between 1 and 98% are highly suitable.

Other additives may be present in variable proportions which may go up to 95% of the weight of the coating. The concentration of these other additives is generally from 0.00001 to 95% of the weight of the coating. In general, the concentration of these other additives represents from 0.1 to 95%, and most frequently from 5 to 90% of the weight of the coating, excluding the fillers.

Particularly advantageous coatings can thus contain from 80 to 100% by weight of polyesters according to the invention and from 0 to 20% of various additives, the coating being present in quantities of 0.01 to 100% of the weight of the uncoated seeds.

Other coatings which are also advantageous may contain from 0.1% to 70% by weight of polyesters according to the invention and from 30 to 99.9% by weight of various additives, the coating being present in quantities of 0.01 to 200% of the weight of the uncoated seeds.

Other particularly advantageous coatings may contain from 0.1 to 25% by weight of polyesters according to the invention, from 30 to 99.8% by weight of fillers and from 0.1 to 69% by weight of other additives, the coating being present in quantities of 0.5 to 100 times the weight of the uncoated seeds. The latter are suitable when it is intended to impart a predetermined shape or size to the seeds.

The invention may be applied to various types of seeds, such as the seeds of leguminous plants, graminaceae or dicotyledon plants. In general, it is employed for the seeds of leguminous plants such as various kinds of peas, beans and lentils, lucerne, clover, vetch, soya, groundnut, field bean and lupin, the seeds of graminaceae such as rye-grass and the cereals (maize, oats, rye, wheat, millet, sorghum, barley, rice, and the like), the seeds of dicotyledon plants such as chicory, lettuce, tobacco, tomato, carrot, cabbage and rape, and the seeds of the crucifers such as the radish. Good results are obtained with the seeds of leguminous plants such as the seeds of peas and soya and with the seeds of graminaceae such as barley, oats and winter barley.

The present invention also relates to a process for coating the seeds.

The coating operation may be carried out according to various methods. The polyester may be employed as such in the liquid state or molten or in the form of a solution in an organic solvent.

The particular method consists in applying the polyester in the liquid or molten state to the seeds and, if necessary, adding fillers or other additives. When it is intended to employ simultaneously the polyester according to the invention and fillers or other additives, the two operations may be carried out simultaneously or in succession. In general, the polyester in the liquid or molten state is applied to the seeds and then the fillers or the other additives are added. The addition of polyester in the liquid or molten state may take place during the addition of fillers or other additives. The addition of fillers or of other additives may be interrupted once or several times and the new application of polyesters in the liquid or molten state may be made in the interval, this being done until the seeds have been completely coated.

Another method consists in employing the polyester in the form of a solution in an organic solvent. The sequence of operations is similar to those employed for coating with the use of polyesters in the liquid or molten state.

Various organic solvents may be employed for this purpose. They are generally chosen from the organic solvents containing aromatic groups or the organic solvents substituted by halogens such as chlorine or bromine, nitro groups, carbonyl groups, carboxyl groups, ester groups and alkoxy groups. It is also possible to employ mixtures of solvents. It is thus possible to employ mixtures of the abovementioned solvents with each other or with alcohols. The solvents are most frequently chosen among organic compounds containing from 1 to 12 carbon atoms; when aromatic compounds are involved their number of carbon atoms is from 4 to 12. The alcohols generally contain from 1 to 8 carbon atoms.

Good results have been obtained with halogenated solvents or more particularly chlorinated solvents alone or mixed with alcohols.

The best results have been obtained with a chloromethane such as methylene chloride alone or mixed with an alcohol such as methanol.

The polyester solutions may contain variable quantities of polyesters. In general, for economic reasons, use is made of solutions the concentration of which is equal to or close to saturation. Good results are obtained with solutions containing from 10 to 60% of their weight of polyesters.

The seeds may be treated with the polyester according to the process of the invention in various types of apparatus which are known per se and suitable for the coating operation. Granulators such as rotary drums, rotating hearth mixers, and the like, may thus be employed.

Polyester, whether in the liquid or molten state, or in the form of solution may be applied to the seeds according to various methods known per se. It is thus possible to spread it dropwise over the seeds arranged in a coating apparatus such as a granulator, or it can be dispersed with the aid of a sprayer-type device. When the polyester is normally solid or pasty at ambient temperature and it is intended to employ it in the molten state, the means employed for spreading or dispersing it would be fitted with a heating device which makes it possible to raise the polyester to its melting temperature or to a temperature slightly above, most frequently to a temperature between the melting temperature and this temperature plus 20° C. In this case, the seeds are kept at a temperature close to, or slightly above, the melting temperature of the polyester.

When the polyester is employed in the molten state, the seeds are cooled after the coating operation in the coating apparatus, preferably with agitation. When the polyester is employed in the form of solution the seeds are dried after coating. The drying may be carried out according to any method known per se such as by passing a forced stream of air, heated if appropriate, over the seeds, which may be arranged for this purpose in devices such as sieves, or by drying using natural ventilation.

Practical examples of implementation are given below in order to illustrate the invention without, however, restricting its scope.

EXAMPLES 1R TO 4

Germination of soya seeds

Soya seeds are coated by means of polycaprolactone in a coating apparatus. Two methods of employing the polyester have been chosen: spraying of molten polyester with the aid of a sprayer heated to 35° C. (Example 2) or 45° C. (Example 4) over the lightly heated seeds, and spraying a 50% solution of polycaprolactone in methylene chloride (Example 3).

The coated seeds are placed to germinate on moist filter paper. The germination tests were carried out at 20°-22° C.

Two grades of polycaprolactones marketed by INTEROX have been employed: CAPA 520 (Examples 2 and 3) and CAPA 215 (Example 4).

A germination test on uncoated seeds was carried out for comparison (Example 1R).

The operating conditions and the results obtained are collated in Table 1.

TABLE 1

| EXAMPLES | 1R | 2 | 3 | 4 |
|---|---|---|---|---|
| Coating g/100 g of seeds | | | | |
| CAPA 520* | | 2 | 2 | |
| CAPA 215* | | | | 2 |
| Germination | | | | |
| rate of germination, % after 1 day | 0 | 3.3 | 6.6 | 3.3 |
| 2 days | 3.3 | 86.3 | 100 | 93.3 |
| 3 days | 23.3 | 100 | 100 | 100 |
| 7 days | 96.6 | 100 | 100 | 100 |

*polycaprolactone sold by Interox

EXAMPLES 5R AND 6

Germination of Oberon pea seeds

Seeds of Oberon peas were coated in a coating apparatus by spraying a solution containing 33% by weight of polycaprolactone CAPA 220 in methylene chloride. A fungicide (Example 6) was introduced into the coating apparatus at the same time.

The coated seeds are placed to germinate in a box on moist filter paper. The germination tests were carried out at 20°-22° C. The vigour of the plantlets was examined after 7 days.

A germination test on uncoated seeds was carried out for comparison (example 5R).

The operating conditions and the results obtained are collated in Table 2.

TABLE 2

| EXAMPLES | 5R | 6 |
|---|---|---|
| Coating g/100 g of seeds | | |
| CAPA 220* | — | 1 |
| Fungicide | — | 0.2 |
| Germination | | |
| rate of germination % after 4 days | 52.4 | 81 |
| 7 days | 100 | 100 |
| Vigour of the plantlets mean weight, mg | | |
| after 7 days | 460 | 680 |

*polycaprolactone sold by Interox

EXAMPLES 7R, 8 AND 9

Germination of winter barley seeds

Winter barley seeds were coated in a coating apparatus with a solution containing 50% by weight of polycaprolactone, CAPA 220, in methylene chloride. The solution was introduced into the coating apparatus by spraying Example 8) or dropwise (Example 9). A fungicide was introduced into the coating apparatus at the same time.

The coated seeds were placed to germinate on moist filter paper. The germination tests were carried out at 20°-22° C. The rate of development was measured after 4 days by counting the number of tigelles which had appeared.

A germination test on uncoated seeds was carried out for comparison (Example 7R).

The operating conditions and the results obtained are collated in Table 3.

TABLE 3

| EXAMPLES | 7R | 8 | 9 |
|---|---|---|---|
| Coating g/100 g of seeds | | | |
| CAPA 220 | | 3 | 3 |
| Fungicide | | 1.8 | 1.8 |
| Germination | | | |
| rate of germination % after 4 days | 96.6 | 96.6 | 93.3 |
| Progress | | | |
| rate of development % | 40 | 93.3 | 86.6. |

EXAMPLES 10R AND 11

Soya cultivation

Soya seeds were coated in a coating apparatus by spraying a solution containing 50% by weight of polycaprolactone CAPA 220 in methylene chloride (Example 11).

The coated seeds were placed in soil. The soil was continuously kept moist. After four months, the plants were harvested. Their mean weight, the mean weight of the pods and the mean weight of the seeds collected was measured.

A comparison test was carried out with uncoated seeds (Example 10R).

The coating doses and the results obtained are collated in Table 4. In each example, averages were taken over four trials, each involving 30 seeds.

TABLE 4

| EXAMPLES | 10R | 11 |
|---|---|---|
| Coating g/100 g of seeds | | |
| CAPA 220 | — | 1 |
| Plant development g/plant | | |
| mean plant weight | 15.3 | 16.5 |
| mean pod weight | 5.8 | 6.5 |
| mean seed weight | 1.23 | 1.41 |

We claim:

1. Seeds coated with an anhydrous coating that consists of a polyester having a melting temperature of 80° C. or less, which has been applied to the seeds as one of a non-aqueous solution and an anhydrous melt.

2. Seeds coated with an anhydrous coating composition that comprises more than 50% by weight of a polyester having a melting temperature of 80° C. or less and at least one additive selected from the group consisting of plant protection products, beneficial bacteria, and fillers, which composition has been applied to the seeds in one of a non-aqueous solution, and an anhydrous melt, and which polyester is a poly-epsilon-caprolactone.

3. Coated seeds according to claim 2, wherein the coating composition comprises a fungicide.

4. Coated seeds according to claim 2, wherein the coating composition comprises bacteria capable of beneficially affecting the germination, formation or growth of the plants.

5. Coated seeds according to claim 2, wherein the weight of the coating composition equals 0.01 to 100% of the weight of the uncoated seeds, and the coating composition contains from 80 to 100% by weight polyester.

6. Coated seeds according to claim 2, wherein the weight of the coating composition equals 0.5 to 100 times the weight of the uncoated seeds.

7. Coated seeds according to claim 2, wherein the weight of the coating composition equals 0.01 to 200% by weight of the uncoated seeds.

8. Seeds coated with an anhydrous coating composition which is a single layer and consists of at least 80% by weight of a polyester having a melting point of 80° C. or less, which polyester is a poly-epsilon-caprolactone, and up to 20% of at least one additive selected from the group consisting of fillers, plant protection products and beneficial bacteria, which bacteria are capable of beneficially affecting the germination, formation or growth of plants produced from the seeds, and wherein the composition has been applied to the seeds in one of a non-aqueous solution and an anhydrous melt.

* * * * *

UNITED STATES PATENT AND TRADEMARK OFFICE
CERTIFICATE OF CORRECTION

PATENT NO. : 4,735,017

DATED : April 5, 1988

INVENTOR(S) : Ignace GAGO et al.

It is certified that error appears in the above-identified patent and that said Letters Patent is hereby corrected as shown below:

In column 2, line 28, delete "in a non-aqueous" and insert therefore --as an anhydrous organic--.

In column 3, line 67, delete "more than 50% by weight" and insert therefore --a major portion of polyester--.

In column 4, line 63, after "simultaneously", insert --i.e., a single layer is applied--.

In claim 1, line 4, delete "a non-aqueous" and insert therefore --an anhydrous organic--.

In claim 2, line 2, delete "more than 50% by weight" and insert therefore --a major portion--; line 3, after "and", insert --a minor portion of --; and line 7, delete "in", and delete "a non-aqueous" and insert therefore --an anhydrous organic--.

UNITED STATES PATENT AND TRADEMARK OFFICE
CERTIFICATE OF CORRECTION

PATENT NO. : 4,735,017

DATED : April 5, 1988

INVENTOR(S) : Ignace GAGO et al.

It is certified that error appears in the above-identified patent and that said Letters Patent is hereby corrected as shown below:

Add claim 9 as follows:
--9. Coated seeds according to claim 3, wherein the anhydrous coating composition comprises at least 80% by weight of a polyester.--

Signed and Sealed this

Fifteenth Day of November, 1988

Attest:

DONALD J. QUIGG

Attesting Officer

Commissioner of Patents and Trademarks